Oct. 19, 1943.   D. E. STEARNS   2,332,182
INSULATION TESTING DEVICE
Filed Aug. 23, 1941   4 Sheets-Sheet 1
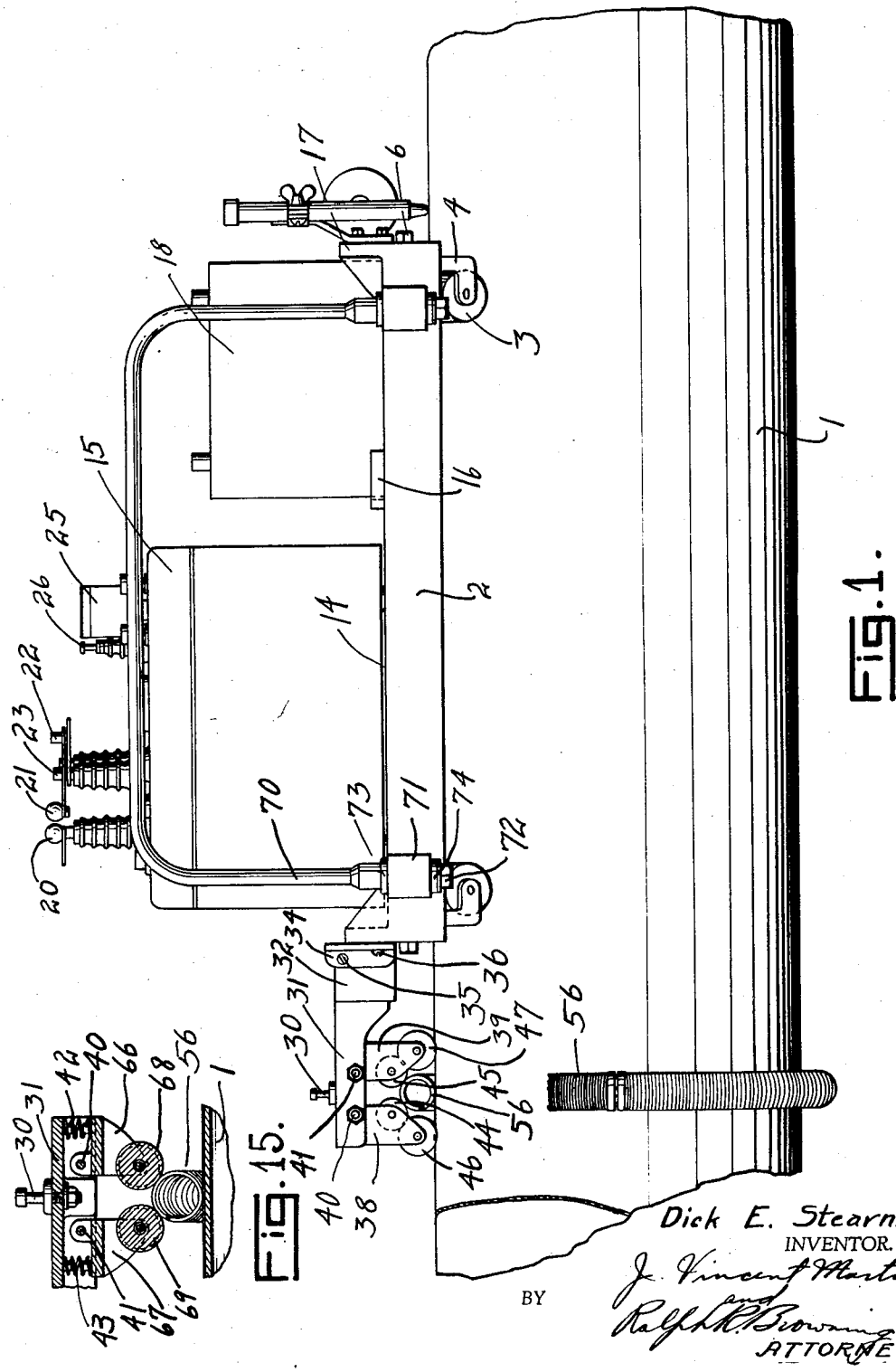
Dick E. Stearns.
INVENTOR.
BY
ATTORNEYS

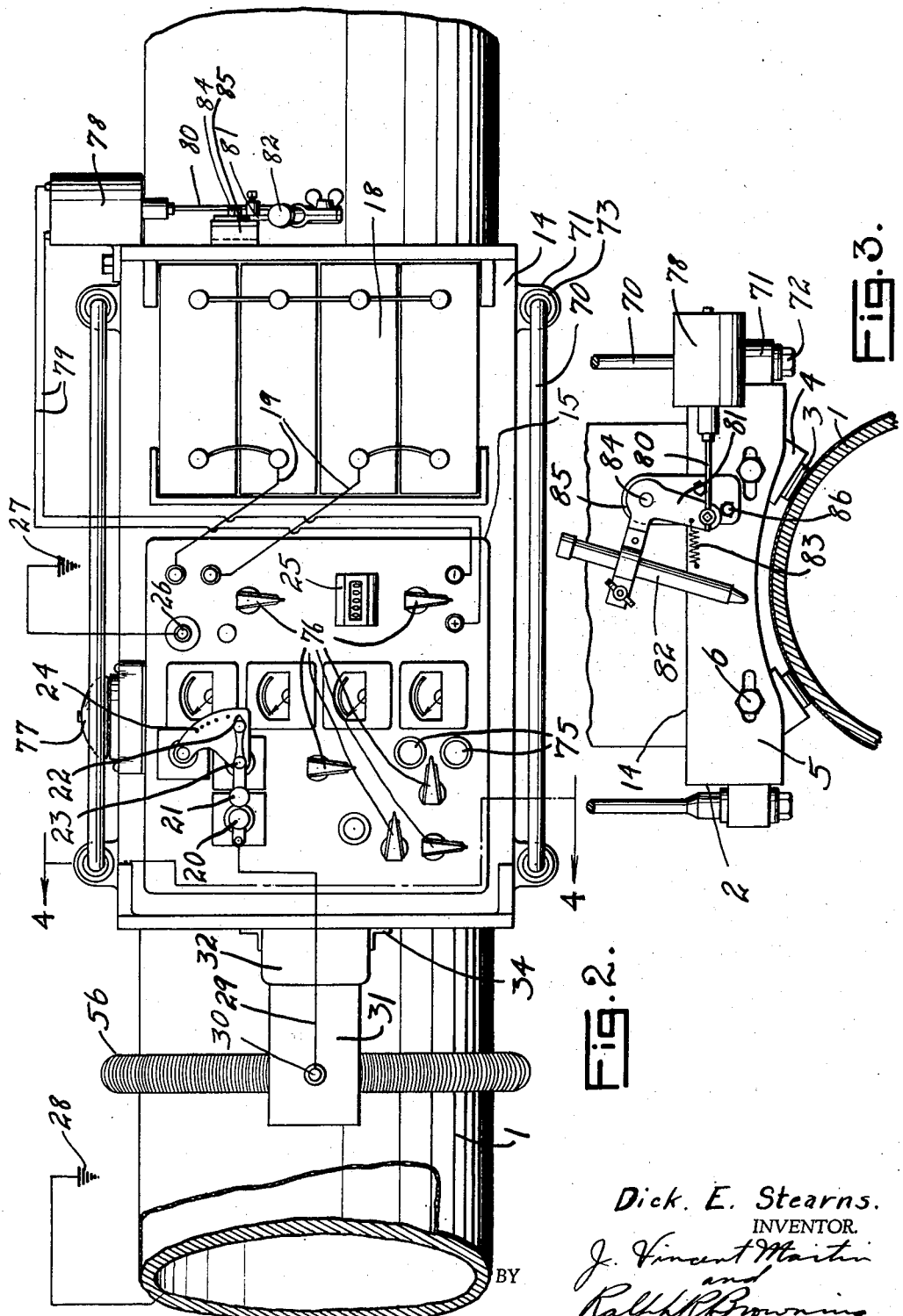

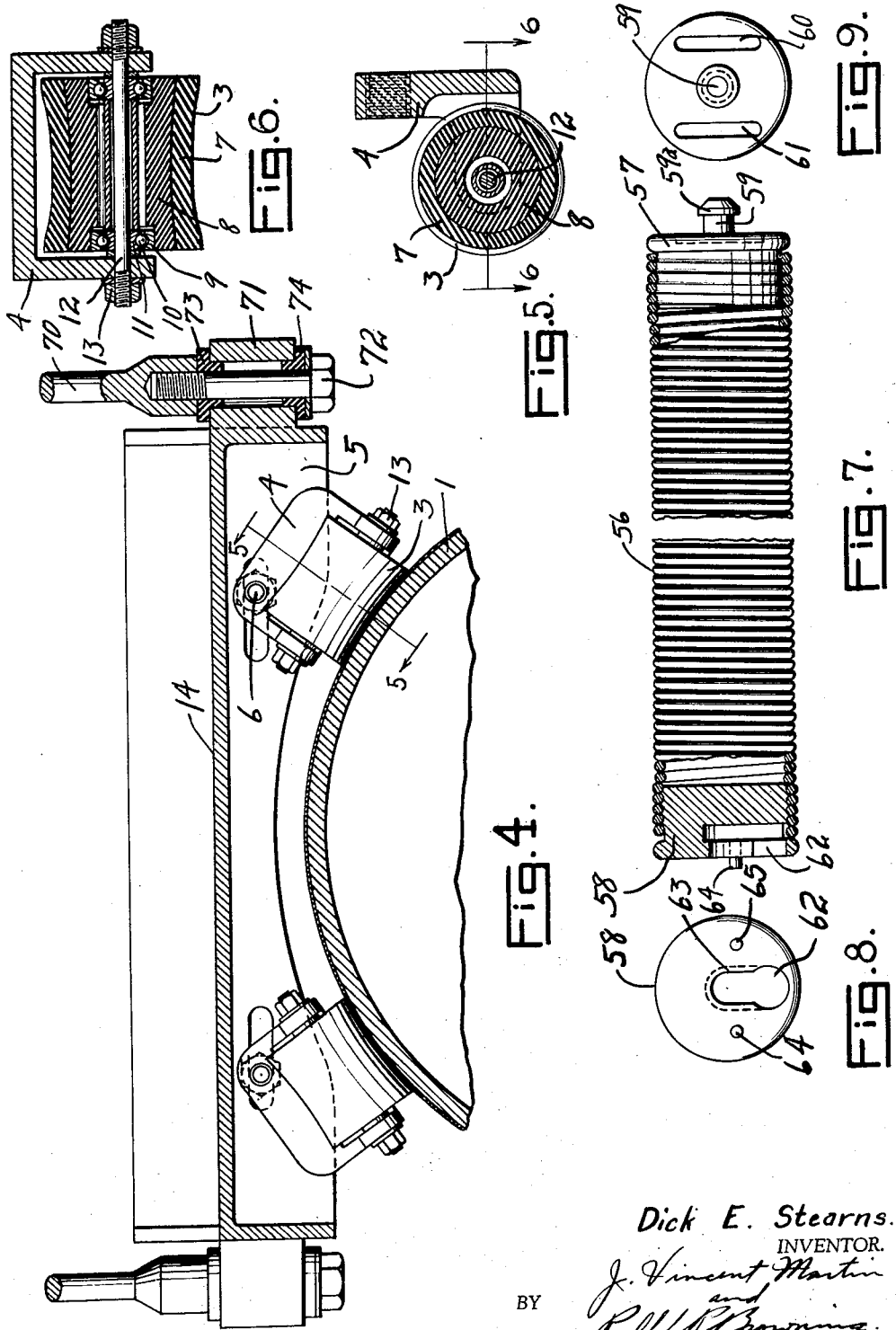

Oct. 19, 1943.                D. E. STEARNS                2,332,182
                         INSULATION TESTING DEVICE
                   Filed Aug. 23, 1941          4 Sheets—Sheet 4
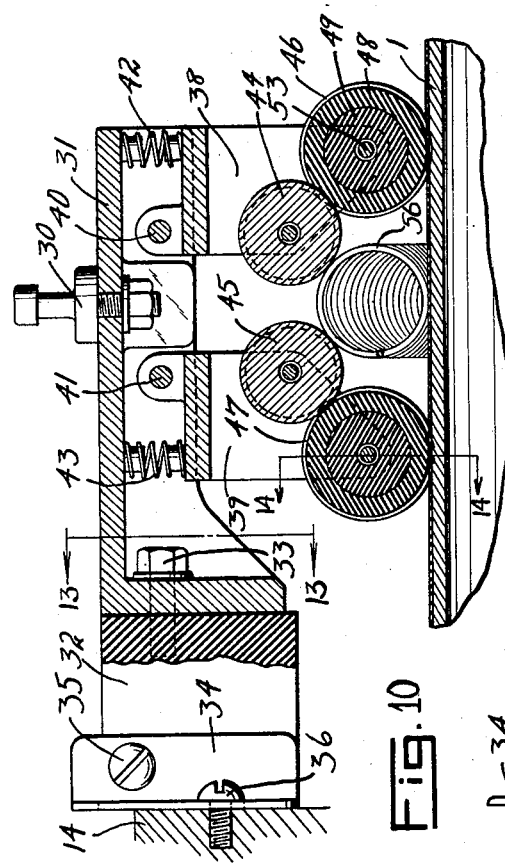
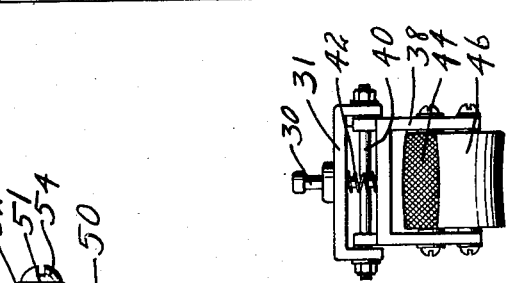
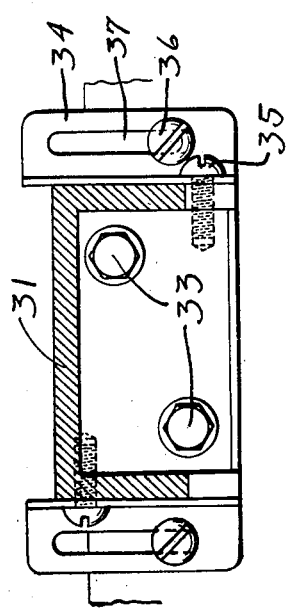
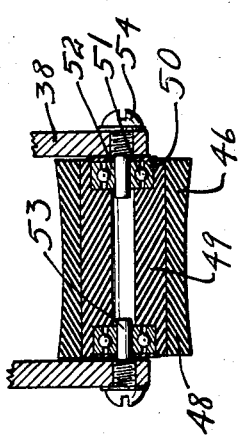
Dick E. Stearns.
INVENTOR.
By J. Vincent Martin
  Ralph R. Browning
           ATTORNEYS Patented Oct. 19, 1943

2,332,182

UNITED STATES PATENT OFFICE 2,332,182

INSULATION TESTING DEVICE

Dick E. Stearns, Shreveport, La.

Application August 23, 1941, Serial No. 408,043

8 Claims. (Cl. 175—183)

This invention relates to an insulation testing device and has for its general object the provision of such a device which may be readily employed for testing the insulating coating on a member of circular cross section, such as, for example, a pipe line.

It is well known that pipe lines of iron or steel embedded in the ground are subject to electrolysis due to various currents flowing in the earth and that unless steps are taken to inhibit the destructive effects of such electrolysis such pipe lines will rapidly deteriorate. Various methods have been devised for protecting pipe lines from these effects, and among them is the practice of coating the pipe with an enamel or other suitable insulating material.

It will be appreciated that in order for such an insulating coating to be completely effective, it must be free from defects, such as would permit even a slight leakage between the pipe and the surrounding soil. If a slight defect be permitted in such insulating coating it is in fact more harmful than if there were no coating at all, because more current will then flow through the defective part per unit of area than would flow through any part of the pipe per unit of area if it had no coating at all. The corrosive effect of electrolysis will, therefore, be greatly increased at the locality of any defect.

In my co-pending application, Serial No. 328,480, filed April 8, 1940, which has now resulted in Patent No. 2,304,513, issued December 8, 1942, I have described and claimed an electrical means for testing an insulating coating of the nature just above referred to, or if any other nature, that application relating particularly to the electrical means for supplying the high voltage testing current and for causing variations in said current, such as would occur in the event a defect is encountered, to produce a visual or audible signal, or both.

This application relates more particularly to a means whereby an electrical apparatus, such as described in said prior application, may be readily transported along a pipe line, to a special electrode by which the surface of such a pipe line, or the like, may be explored efficiently and readily moved along such pipe line, or the like, with said electrical apparatus.

It is an object of this invention, therefore, to provide a means for transporting the high voltage supply source along a pipe line and to provide an electrode for exploring the surface of the pipe line for defects and a means for moving said electrode along the pipe line.

Another object of this invention is to provide a means for marking the pipe line whenever a defect in the insulating is encountered.

Another object of this invention is to provide a means which may be readily moved along the pipe line and which will serve as an electrode and which will explore substantially the entire surface of a pipe line as it is moved therealong.

It is a further object to provide such an exploring electrode which will not be apt to break or injure the insulating coating on the pipe line.

Another object is to provide a novel means for moving such electrode along the pipe line.

Other objects and advantages of this invention will become apparent from the following description taken in connection with the accompanying drawings, wherein are set forth by way of illustration and example certain embodiments of this invention.

In the drawings:

Fig. 1 is a side elevation of a pipe line with a device constructed in accordance with this invention in place thereon, a portion of the exploring electrode having been broken away for purposes of illustration.

Fig. 2 is a top plan view of the device illustrated in Fig. 1, the electrical connections forming a part of such device being shown diagrammatically.

Fig. 3 is a fragmentary view showing a portion of the pipe line in cross section and showing a portion of the device illustrated in Figs. 1 and 2 in end elevation, for the purpose of illustrating the pipe marking device forming a part of this invention.

Fig. 4 is a view similar to Fig. 3, but on a larger scale and showing the carriage portion of the device in transverse cross section.

Fig. 5 shows a cross section through one of the supporting wheels for the carriage taken along the line 5—5 of Fig. 4.

Fig. 6 shows a longitudinal cross section through the same wheel taken along the line 6—6 of Fig. 5.

Fig. 7 is a view partly in side elevation and partly in longitudinal cross section of an exploring electrode constructed in accordance with this invention.

Fig. 8 is an end view of this electrode, illustrating the construction of one of the coupling members by which the ends of the electrode are secured together in use.

Fig. 9 is a similar view showing the connection on the opposite end of the electrode.

Fig. 10 shows a cross section taken in a plane, which is generally radially with respect to the pipe line and illustrating in transverse cross section the exploring electrode and the means for propelling the same along the pipe line and for forming an electrical contact with said electrode during such propulsion, said section being taken along the line 10—10 of Fig. 11.

Fig. 11 shows a bottom plan view of the structure illustrated in Fig. 10.

Fig. 12 is a view on a reduced scale, illustrating the same structure in end elevation.

Fig. 13 shows a transverse cross section taken along the line 13—13 of Fig. 10.

Fig. 14 shows a longitudinal cross section through one of the friction wheels taken along the line 14—14 of Fig. 10.

Fig. 15 is a view on a reduced scale similar to the right hand portion of Fig. 10, illustrating a slight modification.

Referring more particularly to the drawings, the numeral 1 indicates a coated pipe or other circular member and the numeral 2 a carriage having wheels 3 mounted on brackets 4 and adapted to support the carriage upon the pipe. The brackets 4 are adjustably secured to a web 5 of the carriage by means of bolts 6. The wheels 3 are preferably of the construction shown in Figs. 5 and 6, the outer portion of each wheel being of soft rubber 7 and having a core 8 of hard rubber, or the like. The core 8 has an opening therethrough which is counterbored at its ends to receive the outer races 9 for the ball bearings 10. The inner races 11 of these bearings are carried on a shaft 12 which is secured in place by means of nuts 13 on its ends. A suitable spacing member may be employed between the two inner races to properly space them apart.

The carriage has a floor or platform 14 adapted to receive a cabinet or the like 15 adjacent one end, and is provided with upwardly projecting parts 16 and 17 for the purpose of positioning batteries 18, or the like, adjacent the other end. The carriage body is preferably a non-conductor.

The cabinet 15 serves as a housing for an electrical device which may be of the character described in my aforesaid prior application for supplying a high voltage detecting current and for interpreting fluctuations in said current in the form of visible or audible signals. This electrical voltage supplying device is connected to the batteries 18 by suitable leads 19 so as to use said batteries as a source of power. The voltage supplying device may be of any suitable type, the form shown having an adjustable spark gap provided by the electrodes 20 and 21. The electrode 21 is carried on a lever having a pointer 22 on its opposite end and pivoted at 23 intermediate its ends. By swinging the lever about its pivot it will be seen that the length of the spark gap can be adjusted and that it may thus serve as a measure of the voltage produced by the device. The position of the lever may be readily determined by the indicator marks 24 over which the pointer 22 is adapted to pass. The device is also preferably provided with a counter 25 adapted to be actuated each time a defect in insulation is encountered so as to count the total number of defects. One of the high voltage terminals 26 of this device will be grounded in any convenient manner to the earth as shown at 27 when the device is being used on a pipe line. The pipe line may be grounded at some convenient location as shown 28.

The other terminal of the high voltage device will be connected by a lead 29 with a binding post 30 on the support 31, which has means for providing electrical contact with and propelling the exploring electrode as will be presently described. The support 31 may be of electrically conductive material, but is secured to the carriage proper through the medium of a block 32 of insulating material. This support is secured to the block 32 by means of cap screws 33, and the block 32 is in turn secured to the carriage by means of brackets 34 and cap screws 35 and 36. It will be noted that the cap screws 33 and 35 are offset from each other so as to avoid any possibility of a spark jumping between the two due to the high voltage employed. The cap screws 36 extend through slots 37 in the brackets 34 so that the position of the block 32 and the support 31 may be adjusted to a higher or lower level for proper engagement with the surface of the pipe, and the exploring electrode. Below the support 31, which is of inverted channel shaped form, brackets 38 and 39 are supported between the sides of said channel by means of pins 40 and 41. The brackets are normally urged to pivot toward each other by means of springs 42 and 43 inserted between the brackets respectively and the channel support 31. Pivoted between the downwardly extending arms which each of the brackets 38 and 39 provides, are wheels 44 and 45 which are intended to be at all times in electrical contact with the exploring electrode for the purpose of propelling the same along the pipe and of providing electrical contact therewith. If desired, there also may be pivotally mounted between the downwardly extending sides of the brackets 38 and 39 below and in opposite directions from the wheels 44 and 45, a pair of insulated wheels 46 and 47 adapted to roll upon the surface of the pipe. These wheels may be of the structure illustrated in Fig. 14, having an exterior formed of soft rubber 48, or the like, and a core 49 of hard rubber, or the like. The core 49 is counterbored at each end to receive the outer bearing race 50 for the balls 51. The inner bearing race 52 is supported on pintles 53 which are in turn carried by screws 54 mounted in the sides of the bracket 38.

It is intended that when the wheels 46 and 47 are employed they shall serve as friction wheels to provide frictional engagement with the surface of the pipe and with the wheels 44 and 45, so that when the device is moved along the pipe, the wheels 44 and 45 will be made to rotate. These wheels in such case are provided with knurled surfaces 55 which are intended to contact the exploring electrode, which is in the form of a coiled spring 56.

The coiled spring 56 is provided on its opposite ends with connectors 57 and 58, which are of the same external diameter as the spring and which are secured in the ends of the spring. The connector 57 is provided with a projecting centrally located pin 59, having a radial flange 59a adjacent its outer end, and with a pair of parallel grooves 60 and 61 on opposite sides of this pin. The other connector 58 has a slot 62 therein which is of full width at a point spaced from the center of the member so that it may receive the flange 59a of the pin 59, but at its center it is provided with overhanging edges 63 adapted to prevent the endwise withdrawal of the pin 59 once it has been placed within the slot 62 and moved to a central position therein. The connector 58 also has pins 64 and 65 on opposite sides of the slot 62, which pins are adapted to enter the slots 60 and 61 on the connector 57 and prevent the relative rotation of these connectors when the pin 59 is engaged within the slot 62.

It has been found that under many circumstances the use of the wheels 46 and 47 is unnecessary and under such circumstances these are omitted as shown in Fig. 15. In this figure the brackets 66 and 67, which correspond to the brackets 38 and 39, are not provided with a means for mounting wheels such as 46 and 47. They are provided, however, with mountings for wheels 68 and 69, corresponding to the wheels 44 and 45, which wheels are adapted to engage on opposite sides of the electrode 56 and provide electrical contact therewith, as well as to move said electrode along the pipe. When the wheels 46 and 47 are employed, it will be seen that they tend to rotate the wheels 44 and 45 and that rotation of these wheels is transmitted by friction to the electrode 56 tending to rotate the same as well as to push it forward. Where the wheels 46 and 47 are not employed, as in Fig. 15, the knurling 55 may be omitted so that the wheels 68 and 69 might be perfectly smooth if desired. Wheels 68 and 69 must rotate easily to cause proper propulsion of the electrode while permitting it to rotate.

In operation it will be seen that the high voltage from the device within the cabinet 15 will be transmitted to the ground at 27 and from the ground at 28 to the metal of the pipe. The other lead from the high voltage source will be connected to the post 30 on the support 31 and will be transmitted through this support 31, the pivots 40 and 41, and the springs 42 and 43 to the brackets 38 and 39, and that it in turn will pass from the brackets through the wheels 44 and 45 to the exploring electrode 56. The electrode 56 will be tight enough to keep it in contact with the pipe throughout, but very little tighter lest it bind and not rotate easily.

Carriage 2 will be moved along the pipe by means of handles 70 provided for that purpose, these handles being mounted in ears 71 on the body of the carriage. These handles are held in place on said ears by cap screws 72 of insulating material passing through the ears and engaging the handles, and the handles are additionally insulated from the said ears by insulating members 73 and 74.

As the device is pushed along the pipe line, or the like, the weight will rest upon the pipe line being transmitted thereto through the insulated soft rubber wheels 3. These wheels are, of course, adjusted so as to rest evenly on the pipe and serve to form a support for the device without danger of injury to the pipe or its coating. When the device is pushed in one direction or the other, the wheels 44 and 45, or 68 and 69, as the case may be, will be in contact with the exploring electrode 56 and will cause it to roll along the surface of the pipe. It will be seen that this rolling action will cause the spring to contact substantially the entire surface of the pipe as it moves along, but at the same time because the action is a rolling action and not a scraping action there will be practically no danger to the pipe coating or skipping of any substantial portion of the surface of the pipe.

It will be appreciated that while this device has been described in connection with the testing of an insulation on a pipe or pipe line, it could be readily employed on any elongated member having a curved or substantially circular exterior.

While it has been explained that the actual structure and arrangement of the electrical high voltage source in the cabinet 15 forms no part of this invention, it is noted that suitable visual signals 75 may be provided for giving a visible indication when a defect in the pipe coating is encountered, and that suitable controls 76 may be provided for this structure. Audible signal means in the form of a bell 77 is also shown. Also, a suitable power source in form of batteries, or the like, may be provided as well as a means for placing a mark on the pipe if desired when a defect is encountered. Such latter means is a solenoid 78 connected to the high voltage device by means of connection 79, the plunger 80 within this solenoid being connected to a bell crank 81. The bell crank 81 carries a marker 82 and is urged in a direction to lift said marker away from the pipe by means of a spring 83. The bell crank is pivoted at 84 to a suitable bracket 85, which in turn is secured to the carriage by means of cap screws 86, or the like.

It will be appreciated that when a defect is encountered, the solenoid 78 will be energized, causing the plunger 80 to move to the right, as seen in Fig. 3, thus bringing the marker 82 down upon the surface of the pipe to place a mark thereon. When the solenoid is again deenergized, the spring 83 will cause the lifting of this marker.

From the foregoing, it will be appreciated that a means has been provided for carrying out all the objects and advantages sought by this invention.

Having described my invention, I claim:

1. An electrical exploring device for detecting defects in an insulating coating on an elongated member which comprises an exploring electrode in the form of a coiled spring adapted to extend about such member and having its ends secured together to completely embrace such member, and means rotatably engaging and forming a movable electrical contact with said spring at a position remote from the surface of said member for connecting said spring to a high voltage testing circuit and for rolling said spring along such elongated member.

2. An electrical exploring device for detecting defects in an insulating coating on an elongated member, which comprises a coiled spring having its ends secured together and forming an electrode, for contacting said member substantially throughout its circumference and movable therealong with a rolling movement, and means including a plurality of electrically conductive rollers in engagement with opposite side portions of said spring for providing electrical contact with said spring and for causing it to roll along said member.

3. An electrical exploring device for detecting defects in an insulating coating on an elongated member, which comprises a coiled spring having its ends secured together and forming an electrode for contacting said member substantially throughout its circumference and movable therealong with a rolling movement, a plurality of electrically conductive rollers in engagement with opposite side portions of said spring at a position remote from the surface of said member for connecting said spring to a high voltage testing circuit and for causing said spring to roll along said member, and a pair of insulating friction rollers in engagement with said member and with said contacting rollers for rotating said contacting rollers and in turn imparting rotative movement to said electrode when moved along said member.

4. An electrical exploring device for detecting defects in an insulating coating on an elongated member, which comprises a coiled spring having its ends secured together and forming an electrode for contacting said member throughout substantially its circumference and movable therealong with a rolling movement, a plurality of electrically conductive rollers engaging opposite side portions of said electrode at a position remote from the surface of said member, for providing an electrical contact with said electrode and for transmitting force to said electrode to cause it to roll along said member, and means for resiliently holding said rollers against said electrode.

5. An electrical exploring device for detecting defects in an insulating coating on an elongated member, which comprises a coiled spring having its ends secured together and forming an electrode for contacting said member substantially throughout its surface and movable therealong with a rolling movement, a carriage, insulating wheels for supporting said carriage on said member for movement longitudinally of said member, and a plurality of electrically conductive rollers carried by said carriage and in engagement with opposite sides of said electrode, providing electrical contact with said electrode and for moving it longitudinally of said member when said carriage is moved longitudinally of said member.

6. In a device of the character described, a carriage comprising a platform on wheels, and an electrode pusher and contactor carried by and electrically insulated from said platform, said pusher and contactor including a plurality of rollers for engaging opposite portions of an electrode to form electrical contact therewith and to apply force thereto for pushing it along.

7. In a device of the character described, a carriage comprising a platform on wheels, an exploring electrode in the form of a flexible elongated member of circular cross section and of an electrically conductive material adapted to embrace such member adjacent said carriage, and an electrode pusher and contactor carried by and electrically insulated from said platform and having parts in electrical and mechanical contact with said electrode whereby movement of said carriage longitudinally along a member to be tested will cause a rolling movement of said electrode along such member.

8. An electrical exploring device for detecting defects in an insulating coating on an elongated member, which comprises a coiled spring having its ends secured together and forming an electrode for contacting said member throughout substantially its circumference and movable therealong with a rolling movement, and a plurality of electrically conductive rollers engaging opposite side portions of the electrode at a position remote from said member for providing an electrical contact with said electrode and for transmitting force to said electrode to cause it to move along said member.

DICK E. STEARNS.